(12) United States Patent
Stafford

(10) Patent No.: US 6,168,126 B1
(45) Date of Patent: Jan. 2, 2001

(54) MULTI-ADJUSTABLE STAND FOR VEHICLE ELECTRONIC COMPONENTS

(76) Inventor: Ronnie D. Stafford, 42026 Arthur, Belleville, MI (US) 48111

( * ) Notice: Under 35 U.S.C. 154(b), the term of this patent shall be extended for 0 days.

(21) Appl. No.: 09/325,681

(22) Filed: Jun. 3, 1999

(51) Int. Cl.[7] .............................. E04G 3/00; A47F 5/00; A47F 7/00; F16M 11/00; F16M 13/00
(52) U.S. Cl. ..................................... 248/276.1; 248/122.1
(58) Field of Search ............................ 248/276.1, 122.1, 248/124.1, 176.1, 125.7, 185.1; 403/342, 343, 321, 322.4

(56) References Cited

U.S. PATENT DOCUMENTS

| 1,236,887 | * | 8/1917 | Stafford | 248/276.1 |
|---|---|---|---|---|
| 1,382,783 | * | 6/1921 | Howard | 248/276.1 |
| 1,460,697 | * | 7/1923 | Bendlin | 248/276.1 |
| 4,943,181 | * | 7/1990 | Murphy | 403/324 |
| 4,991,814 | * | 2/1991 | Schmidt et al. | 403/342 |
| 5,342,137 | * | 8/1994 | Peng | 248/122.1 |
| 5,687,945 | * | 11/1997 | Lee | 248/276.1 |
| 5,751,548 | * | 5/1998 | Hall et al. | 248/122.1 |
| 5,876,005 | * | 3/1999 | Vasconi | 248/276.1 |

* cited by examiner

Primary Examiner—Anita M. King
Assistant Examiner—Jerome DeLuca
(74) Attorney, Agent, or Firm—Joseph N. Breaux

(57) ABSTRACT

A mounting stand securable within a vehicle passenger compartment to which an electronic component such as a CB radio is mounted that is adjustable at a number of location and in a number of planes to allow the user adjust the stand to provide optimum positioning of the electronic component within the vehicle for convenient safe use thereof.

1 Claim, 2 Drawing Sheets

MULTI-ADJUSTABLE STAND FOR VEHICLE ELECTRONIC COMPONENTS

TECHNICAL FIELD

The present invention relates to stands securable within a vehicle for supporting an electronic component such as a citizens band radio and more particularly to a multi-adjustable stand for vehicle electronic components that includes an exterior base attachment plate assembly; an interior base plate assembly; a pivoting lower support shaft assembly; a dog-leg shaped, height adjustable, large circle adjustable, support member assembly; a T-shaped, height adjustable vertical axis adjustable clevis assembly; and a horizontal axis pivotal device mounting plate assembly; the exterior base attachment plate assembly including a rigid exterior plate having a number of threaded connectors permanently secured thereto each in alignment with a separate exterior securing bolt aperture; the interior base plate assembly including a rigid interior plate having a number of interior securing bolt apertures that are positioned on the rigid interior plate such that all of the interior securing bolt apertures are simultaneously positionable in registration with an exterior securing bolt aperture, four threaded securing bolts companionately threaded to engage the threaded connectors of the exterior base attachment plate assembly, and two spaced, parallel oriented, pivot plates extending perpendicularly from a top surface of the interior plate, each pivot plate having a pivot pin aperture formed therethrough concentrically aligned with the pivot pin aperture of the other pivot plate; the pivoting lower support shaft assembly including a straight rigid support section having a threaded top end opening and a tubular axle structure having a passageway formed therethrough and secured to the bottom end thereof having a length equal to the spacing between the two pivot plates, a pivot axle including a shaft adapted to pass sequentially through one of the pivot pin apertures, the passageway of the tubular axle structure and the remaining pivot pin aperture; the shaft including a head at one end thereof of larger dimension that the pivot pin apertures and a threaded insertion end threaded to engage a lower support shaft locking nut structure having a threaded portion attached to a torquing rod portion; the dog-leg shaped, height adjustable, large circle adjustable, support member assembly including a rigid support dog-leg member including a top portion joined to a bottom portion at an angle of about forty-five degrees, a top end of the top portion having a threaded opening, a bottom end of the bottom portion having a threaded shaft companionately threaded to engage the threaded top end opening of the straight rigid support section and oriented in parallel with the top portion and at an angle of about forty-five degrees with respect to the bottom portion, and a support member lock nut structure including a threaded portion attached to a torquing rod portion; the T-shaped, height adjustable vertical axis adjustable clevis assembly including a thread ended bottom shaft threaded to engage the threaded opening of the top end of the top portion of the dog-leg member and a tubular device mounting plate connecting structure attached at the center thereof to another end of the bottom shaft and perpendicular thereto, and a clevis lock nut structure including a threaded portion and a torquing rod portion; the horizontal axis pivotal device mounting plate assembly including a rigid device mounting plate having a pair of spaced clevis attachment plates each provided with a device mounting plate pivot pin aperture extending from a bottom surface thereof and a device mounting plate pivot pin assembly including a thread ended device mounting plate pivot pin and a mounting plate lock nut structure including a threaded portion and a torquing portion.

BACKGROUND ART

It is often difficult to mount an electronic component, such as a citizens band radio, at a convenient location within a vehicle, such as a truck or the like. It would be desirable, therefore, to have a stand securable within a vehicle passenger compartment that allowed the user adjust the stand to provide optimum positioning of the electronic component within the vehicle for convenient safe use thereof.

GENERAL SUMMARY DISCUSSION OF INVENTION

It is thus an object of the invention to provide a multi-adjustable stand for vehicle electronic components that includes an exterior base attachment plate assembly; an interior base plate assembly; a pivoting lower support shaft assembly; a dog-leg shaped, height adjustable, large circle adjustable, support member assembly; a T-shaped, height adjustable vertical axis adjustable clevis assembly; and a horizontal axis pivotal device mounting plate assembly; the exterior base attachment plate assembly including a rigid exterior plate having a number of threaded connectors permanently secured thereto each in alignment with a separate exterior securing bolt aperture; the interior base plate assembly including a rigid interior plate having a number of interior securing bolt apertures that are positioned on the rigid interior plate such that all of the interior securing bolt apertures are simultaneously positionable in registration with an exterior securing bolt aperture, four threaded securing bolts companionately threaded to engage the threaded connectors of the exterior base attachment plate assembly, and two spaced, parallel oriented, pivot plates extending perpendicularly from a top surface of the interior plate, each pivot plate having a pivot pin aperture formed therethrough concentrically aligned with the pivot pin aperture of the other pivot plate; the pivoting lower support shaft assembly including a straight rigid support section having a threaded top end opening and a tubular axle structure having a passageway formed therethrough and secured to the bottom end thereof having a length equal to the spacing between the two pivot plates, a pivot axle including a shaft adapted to pass sequentially through one of the pivot pin apertures, the passageway of the tubular axle structure and the remaining pivot pin aperture; the shaft including a head at one end thereof of larger dimension that the pivot pin apertures and a threaded insertion end threaded to engage a lower support shaft locking nut structure having a threaded portion attached to a torquing rod portion; the dog-leg shaped, height adjustable, large circle adjustable, support member assembly including a rigid support dog-leg member including a top portion joined to a bottom portion at an angle of about forty-five degrees, a top end of the top portion having a threaded opening, a bottom end of the bottom portion having a threaded shaft companionately threaded to engage the threaded top end opening of the straight rigid support section and oriented in parallel with the top portion and at an angle of about forty-five degrees with respect to the bottom portion, and a support member lock nut structure including a threaded portion attached to a torquing rod portion; the T-shaped, height adjustable vertical axis adjustable clevis assembly including a thread ended bottom shaft threaded to engage the threaded opening of the top end of the top portion of the dog-leg member and a tubular device mounting plate connecting structure attached at the center thereof to another end of the bottom shaft and perpendicular thereto, and a clevis lock nut structure including a threaded portion and a torquing rod portion; the horizontal axis pivotal device mounting plate assembly including a rigid device mounting plate having a pair of spaced clevis attachment plates each provided with a device mounting plate pivot pin aperture extending from a bottom surface thereof and a device mounting plate pivot pin assembly including a thread ended device mounting plate pivot pin and a mounting plate lock nut structure including a threaded portion and a torquing portion.

Accordingly, a multi-adjustable stand for vehicle electronic components is provided. The multi-adjustable stand for vehicle electronic components includes an exterior base attachment plate assembly; an interior base plate assembly; a pivoting lower support shaft assembly; a dog-leg shaped, height adjustable, large circle adjustable, support member assembly; a T-shaped, height adjustable vertical axis adjustable clevis assembly; and a horizontal axis pivotal device mounting plate assembly; the exterior base attachment plate assembly including a rigid exterior plate having a number of threaded connectors permanently secured thereto each in alignment with a separate exterior securing bolt aperture; the interior base plate assembly including a rigid interior plate having a number of interior securing bolt apertures that are positioned on the rigid interior plate such that all of the interior securing bolt apertures are simultaneously positionable in registration with an exterior securing bolt aperture, four threaded securing bolts companionately threaded to engage the threaded connectors of the exterior base attachment plate assembly, and two spaced, parallel oriented, pivot plates extending perpendicularly from a top surface of the interior plate, each pivot plate having a pivot pin aperture formed therethrough concentrically aligned with the pivot pin aperture of the other pivot plate; the pivoting lower support shaft assembly including a straight rigid support section having a threaded top end opening and a tubular axle structure having a passageway formed therethrough and secured to the bottom end thereof having a length equal to the spacing between the two pivot plates, a pivot axle including a shaft adapted to pass sequentially through one of the pivot pin apertures, the passageway of the tubular axle structure and the remaining pivot pin aperture; the shaft including a head at one end thereof of larger dimension that the pivot pin apertures and a threaded insertion end threaded to engage a lower support shaft locking nut structure having a threaded portion attached to a torquing rod portion; the dog-leg shaped, height adjustable, large circle adjustable, support member assembly including a rigid support dog-leg member including a top portion joined to a bottom portion at an angle of about forty-five degrees, a top end of the top portion having a threaded opening, a bottom end of the bottom portion having a threaded shaft companionately threaded to engage the threaded top end opening of the straight rigid support section and oriented in parallel with the top portion and at an angle of about forty-five degrees with respect to the bottom portion, and a support member lock nut structure including a threaded portion attached to a torquing rod portion; the T-shaped, height adjustable vertical axis adjustable clevis assembly including a thread ended bottom shaft threaded to engage the threaded opening of the top end of the top portion of the dog-leg member and a tubular device mounting plate connecting structure attached at the center thereof to another end of the bottom shaft and perpendicular thereto, and a clevis lock nut structure including a threaded portion and a torquing rod portion; the horizontal axis pivotal device mounting plate assembly including a rigid device mounting plate having a pair of spaced clevis attachment plates each provided with a device mounting plate pivot pin aperture extending from a bottom surface thereof and a device mounting plate pivot pin assembly including a thread ended device mounting plate pivot pin and a mounting plate lock nut structure including a threaded portion and a torquing portion.

BRIEF DESCRIPTION OF DRAWINGS

For a further understanding of the nature and objects of the present invention, reference should be made to the following detailed description, taken in conjunction with the accompanying drawings, in which like elements are given the same or analogous reference number and wherein.

EXEMPLARY MODE FOR CARRYING OUT THE INVENTION

Figure 1:
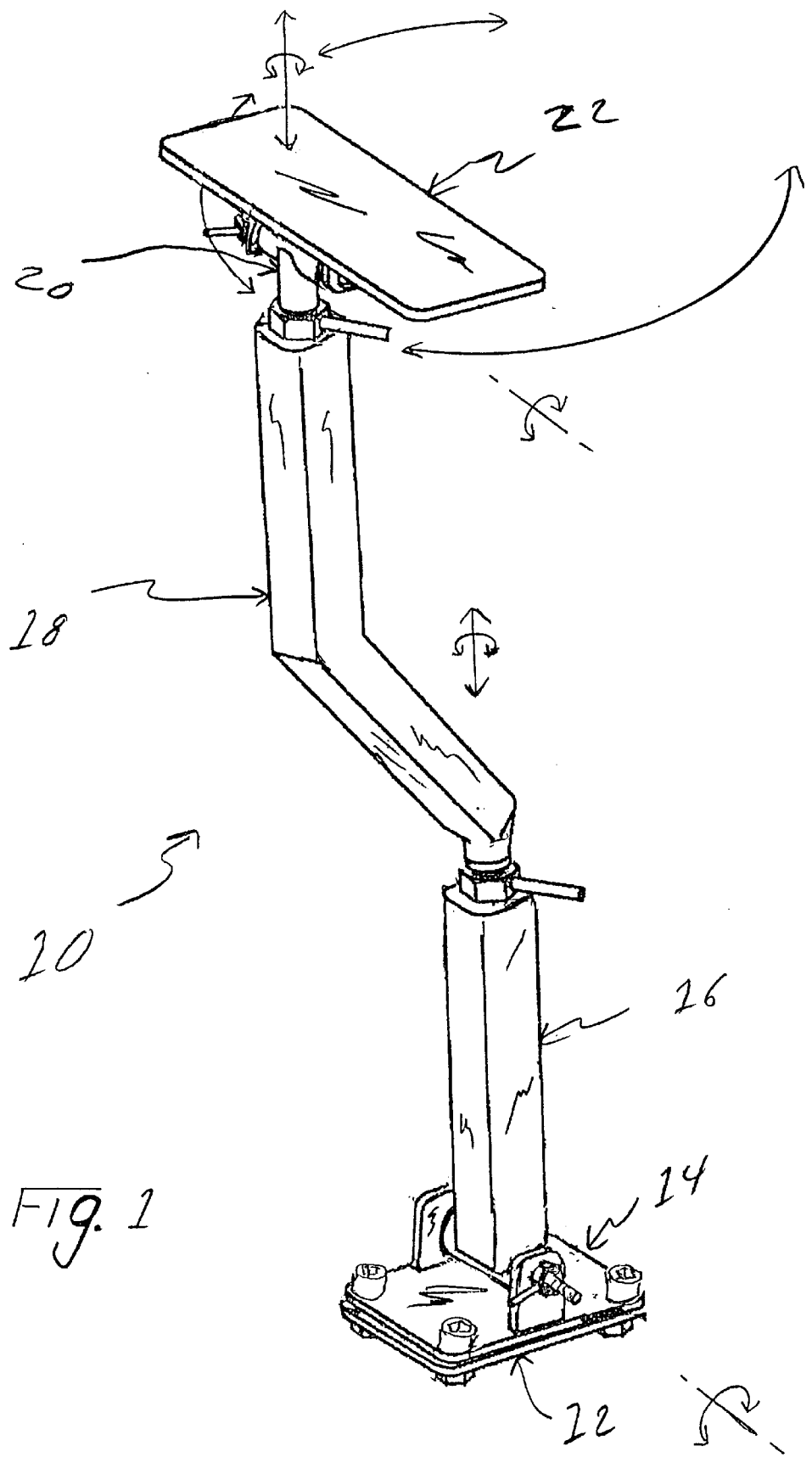
FIG. 1 is a perspective view of an exemplary embodiment of the multi-adjustable stand for vehicle electronic components of the invention showing the exterior base attachment plate assembly; the interior base plate assembly; the pivoting lower support shaft assembly; the dog-leg shaped, height adjustable, large circle adjustable, support member assembly; the T-shaped, height adjustable vertical axis adjustable clevis assembly; and the horizontal axis pivotal device mounting plate assembly.

FIG. 1 is a perspective view of an exemplary embodiment of the multi-adjustable stand for vehicle electronic components of the invention generally designated 10. Multi-adjustable stand 10 includes an exterior base attachment plate assembly, generally designated 12; an interior base plate assembly, generally designated 14; a pivoting lower support shaft assembly, generally designated 16; a dog-leg shaped, height adjustable, large circle adjustable, support member assembly, generally designated 18; a T-shaped, height adjustable vertical axis adjustable clevis assembly, generally designated 20; and a horizontal axis pivotal device mounting plate assembly, generally designated 22.

Figure 2:
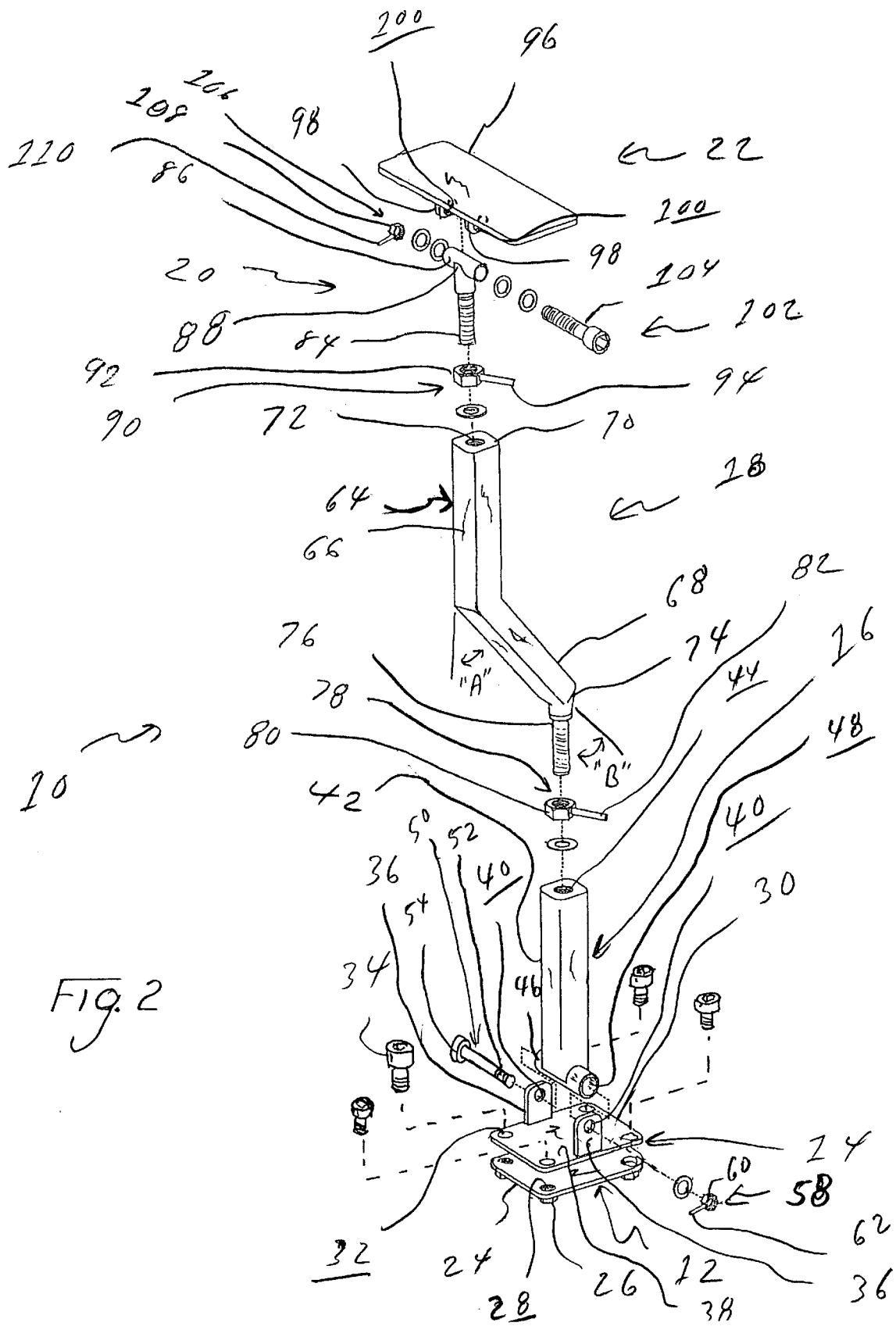
FIG. 2 is an exploded view of the multi-adjustable stand for vehicle electronic components of FIG. 1 showing the exterior base attachment plate assembly; the interior base plate assembly; the pivoting lower support shaft assembly; the dog-leg shaped, height adjustable, large circle adjustable, support member assembly; the T-shaped, height adjustable vertical axis adjustable clevis assembly; and the horizontal axis pivotal device mounting plate assembly; the exterior base attachment plate assembly including a rigid exterior plate having a number of threaded connectors permanently secured thereto each in alignment with a separate exterior securing bolt aperture; the interior base plate assembly including a rigid interior plate having a number of interior securing bolt apertures that are positioned on the rigid interior plate such that all of the interior securing bolt apertures are simultaneously positionable in registration with an exterior securing bolt aperture, four threaded securing bolts companionately threaded to engage the threaded connectors of the exterior base attachment plate assembly, and two spaced, parallel oriented, pivot plates extending perpendicularly from a top surface of the interior plate, each pivot plate having a pivot pin aperture formed therethrough concentrically aligned with the pivot pin aperture of the other pivot plate; the pivoting lower support shaft assembly including a straight rigid support section having a threaded top end opening and a tubular axle structure having a passageway formed therethrough and secured to the bottom end thereof having a length equal to the spacing between the two pivot plates, a pivot axle including a shaft adapted to pass sequentially through one of the pivot pin apertures, the passageway of the tubular axle structure and the remaining pivot pin aperture; the shaft including a head at one end thereof of larger dimension that the pivot pin apertures and a threaded insertion end threaded to engage a lower support shaft locking nut structure having a threaded portion attached to a torquing rod portion; the dog-leg shaped, height adjustable, large circle adjustable, support member assembly including a rigid support dog-leg member including a top portion joined to a bottom portion at an angle of about forty-five degrees, a top end of the top portion having a threaded opening, a bottom end of the bottom portion having a threaded shaft companionately threaded to engage the threaded top end opening of the straight rigid support section and oriented in parallel with the top portion and at an angle of about forty-five degrees with respect to the bottom portion, and a support member lock nut structure including a threaded portion attached to a torquing rod portion; the T-shaped, height adjustable vertical axis adjustable clevis assembly including a thread ended bottom shaft threaded to engage the threaded opening of the top end of the top portion of the dog-leg member and a tubular device mounting plate connecting structure attached at the center thereof to another end of the bottom shaft and perpendicular thereto, and a clevis lock nut structure including a threaded portion and a torquing rod portion; the horizontal axis pivotal device mounting plate assembly including a rigid device mounting plate having a pair of spaced clevis attachment plates each provided with a device mounting plate pivot pin aperture extending from a bottom surface thereof and a device mounting plate pivot pin assembly including a thread ended device mounting plate pivot pin and a mounting plate lock nut structure including a threaded portion and a torquing portion.

With reference to FIG. 2, exterior base attachment plate assembly includes a rigid metal exterior plate 24 having a four threaded weld nut connectors 26 permanently secured thereto each in alignment with a separate exterior securing bolt aperture 28. Interior base plate assembly 14 includes a rigid steel interior plate 30 having a four interior securing bolt apertures 32 that are positioned on rigid interior plate 30 such that all of the interior securing bolt apertures 32 are simultaneously positionable in registration with an exterior securing bolt aperture 28, four threaded securing bolts 34 companionately threaded to engage the threaded weld nut connectors 26 of exterior base attachment plate assembly 12, and two spaced, parallel oriented, pivot plates 36 extending perpendicularly from a top surface 38 of interior plate 30, each pivot plate 36 having a pivot pin aperture 40 formed therethrough concentrically aligned with the pivot pin aperture 40 of the other pivot plate 36.

Pivoting lower support shaft assembly 16 includes a straight rigid support section 42 having a threaded top end opening 44 and a tubular axle structure 46 having a passageway 48 formed therethrough and secured to the bottom end thereof having a length equal to the spacing between the two pivot plates 36, a pivot axle, generally desginated 50 including a shaft 52 adapted to pass sequentially through one of the pivot pin apertures 40, the passageway 48 of tubular axle structure 46 and the remaining pivot pin aperture 40. Shaft 52 including a head 54 at one end thereof of larger dimension that the pivot pin apertures 40 and a threaded insertion end threaded to engage a lower support shaft locking nut structure, generally desginated 58 having a threaded nut portion 60 attached to a torquing rod portion 62.

Dog-leg shaped, height adjustable, large circle adjustable, support member assembly 18 includes a rigid support dog-leg member, generally desginated 64, including a top portion 66 joined to a bottom portion 68 at an angle "A" of about forty-five degrees, a top end 70 of top portion 64 having a threaded opening 72, a bottom end 74 of bottom portion 68 having a threaded shaft 76 companionately threaded to engage threaded top end opening 44 of straight rigid support section 42 and oriented in parallel with top portion 66 and at an angle "B" of about forty-five degrees with respect to bottom portion 68, and a support member lock nut structure, generally desginated 78, including a threaded nut portion 80 attached to a torquing rod portion 82.

T-shaped, height adjustable vertical axis adjustable clevis assembly 20 includes a thread ended bottom shaft 84 threaded to engage threaded opening 72 of top end 70 of top portion 66 of dog-leg member 64 and a tubular device mounting plate connecting structure 86 attached at the center thereof to another end 88 of bottom shaft 84 and perpendicular thereto, and a clevis lock nut structure, generally desginated 90, including a threaded nut portion 92 and a torquing rod portion 94.

Horizontal axis pivotal device mounting plate assembly 22 includes a rigid steel device mounting plate 96 having a pair of spaced clevis attachment plates 98 each provided with a device mounting plate pivot pin aperture 100 extending from a bottom surface thereof and a device mounting plate pivot pin assembly, generally desginated 102 including a thread ended device mounting plate pivot pin 104 and a mounting plate lock nut structure, generally desginated 106 including a threaded nut portion 108 and a torquing rod portion 110.

In use, the user drills four holes through the floor panel of the vehicle in a pattern corresponding to the pattern of securing bolt apertures 32 on rigid interior plate 30. Exterior base attachment plate assembly 12 is positioned on the exterior side of the floor panel in alignment with the drilled holes and interior base plate assembly 14 is placed in the interior of the vehicle in alignment with the drilled holes and the four threaded securing bolts 34 used to rigidly secure exterior base attachment plate assembly 12 and interior base plate assembly 14 together with the floor panel therebetween. Pivoting lower support shaft assembly 16, dog-leg shaped, height adjustable, large circle adjustable, support member assembly 18, T-shaped, height adjustable vertical axis adjustable clevis assembly 20; and horizontal axis pivotal device mounting plate assembly 22 are then adjusted as need to position rigid steel device mounting plate 96 in the desired location and orientation to support an electronic component such as a CB radio.

It can be seen from the preceding description that a multi-adjustable stand for vehicle electronic components has been provided that includes an exterior base attachment plate assembly; an interior base plate assembly; a pivoting lower support shaft assembly; a dog-leg shaped, height adjustable, large circle adjustable, support member assembly; a T-shaped, height adjustable vertical axis adjustable clevis assembly; and a horizontal axis pivotal device mounting plate assembly; the exterior base attachment plate assembly including a rigid exterior plate having a number of threaded connectors permanently secured thereto each in alignment with a separate exterior securing bolt aperture; the interior base plate assembly including a rigid interior plate having a number of interior securing bolt apertures that are positioned on the rigid interior plate such that all of the interior securing bolt apertures are simultaneously positionable in registration with an exterior securing bolt aperture, four threaded securing bolts companionately threaded to engage the threaded connectors of the exterior base attachment plate assembly, and two spaced, parallel oriented, pivot plates extending perpendicularly from a top surface of the interior plate, each pivot plate having a pivot pin aperture formed therethrough concentrically aligned with the pivot pin aperture of the other pivot plate; the pivoting lower support shaft assembly including a straight rigid support section having a threaded top end opening and a tubular axle structure having a passageway formed therethrough and secured to the bottom end thereof having a length equal to the spacing between the two pivot plates, a pivot axle including a shaft adapted to pass sequentially through one of the pivot pin apertures, the passageway of the tubular axle structure and the remaining pivot pin aperture; the shaft including a head at one end thereof of larger dimension that the pivot pin apertures and a threaded insertion end threaded to engage a lower support shaft locking nut structure having a threaded portion attached to a torquing rod portion; the dog-leg shaped, height adjustable, large circle adjustable, support member assembly including a rigid support dog-leg member including a top portion joined to a bottom portion at an angle of about forty-five degrees, a top end of the top portion having a threaded opening, a bottom end of the bottom portion having a threaded shaft companionately threaded to engage the threaded top end opening of the straight rigid support section and oriented in parallel with the top portion and at an angle of about forty-five degrees with respect to the bottom portion, and a support member lock nut structure including a threaded portion attached to a torquing rod portion; the T-shaped, height adjustable vertical axis adjustable clevis assembly including a thread ended bottom shaft threaded to engage the threaded opening of the top end of the top portion of the dog-leg member and a tubular device mounting plate connecting structure attached at the center thereof to another end of the bottom shaft and perpendicular thereto, and a clevis lock nut structure including a threaded portion and a torquing rod portion; the horizontal axis pivotal device mounting plate assembly including a rigid device mounting plate having a pair of spaced clevis attachment plates each provided with a device mounting plate pivot pin aperture extending from a bottom surface thereof and a device mounting plate pivot pin assembly including a thread ended device mounting plate pivot pin and a mounting plate lock nut structure including a threaded portion and a torquing portion.

It is noted that the embodiment of the multi-adjustable stand for vehicle electronic components described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A multi-adjustable stand for vehicle electronic components comprising:
   an exterior base attachment plate assembly;
   an interior base plate assembly;
   a pivoting lower support shaft assembly;
   a dog-leg shaped, height adjustable, large circle adjustable, support member assembly;
   a T-shaped, height adjustable vertical axis adjustable clevis assembly; and
   a horizontal axis pivotal device mounting plate assembly;

said exterior base attachment plate assembly including a rigid exterior plate having a number of threaded connectors permanently secured thereto each in alignment with a separate exterior securing bolt aperture;

said interior base plate assembly including a rigid interior plate having a number of interior securing bolt apertures that are positioned on said rigid interior plate such that all of said interior securing bolt apertures are simultaneously positionable in registration with an exterior securing bolt aperture, four threaded securing bolts companionately threaded to engage said threaded connectors of said exterior base attachment plate assembly, and two spaced, parallel oriented, pivot plates extending perpendicularly from a top surface of said interior plate, each pivot plate having a pivot pin aperture formed therethrough concentrically aligned with said pivot pin aperture of said other pivot plate;

said pivoting lower support shaft assembly including a straight rigid support section having a threaded top end opening and a tubular axle structure having a passageway formed therethrough and secured to said bottom end thereof having a length equal to said spacing between said two pivot plates, a pivot axle including a shaft adapted to pass sequentially through one of said pivot pin apertures, said passageway of said tubular axle structure and said remaining pivot pin aperture;

said shaft including a head at one end thereof of larger dimension that said pivot pin apertures and a threaded insertion end threaded to engage a lower support shaft locking nut structure having a threaded portion attached to a torquing rod portion;

said dog-leg shaped, height adjustable, large circle adjustable, support member assembly including a rigid support dog-leg member including a top portion joined to a bottom portion at an angle of about forty-five degrees, a top end of said top portion having a threaded opening, a bottom end of said bottom portion having a threaded shaft companionately threaded to engage said threaded top end opening of said straight rigid support section and oriented in parallel with said top portion and at an angle of about forty-five degrees with respect to said bottom portion, and a support member lock nut structure including a threaded portion attached to a torquing rod portion;

said T-shaped, height adjustable vertical axis adjustable clevis assembly including a thread ended bottom shaft threaded to engage said threaded opening of said top end of said top portion of said dog-leg member and a tubular device mounting plate connecting structure attached at said center thereof to another end of said bottom shaft and perpendicular thereto, and a clevis lock nut structure including a threaded portion and a torquing rod portion;

said horizontal axis pivotal device mounting plate assembly including a rigid device mounting plate having a pair of spaced clevis attachment plates each provided with a device mounting plate pivot pin aperture extending from a bottom surface thereof and a device mounting plate pivot pin assembly including a thread ended device mounting plate pivot pin and a mounting plate lock nut structure including a threaded portion and a torquing portion.

* * * * *